United States Patent [19]

Connell

[11] 4,430,786
[45] Feb. 14, 1984

[54] METHOD OF MAKING A WHEEL COVER SIMULATING A WIRE SPOKE WHEEL

[76] Inventor: James Connell, 5017 Dianna Dr., Bloomfield Hills, Mich. 48013

[21] Appl. No.: 378,708

[22] Filed: May 17, 1982

Related U.S. Application Data

[62] Division of Ser. No. 140,035, Apr. 14, 1980, Pat. No. 4,397,504.

[51] Int. Cl.³ .............................................. B21D 53/32
[52] U.S. Cl. .................................... 29/159 A; 29/451; 29/453
[58] Field of Search ............. 29/159 A, 446, 451–453, 29/225, 229; 301/37 SS, 37 P, 37 CM

[56] References Cited

U.S. PATENT DOCUMENTS

| 362,548 | 5/1887 | Smith | 29/453 |
| 1,753,631 | 4/1930 | Walters | 29/159 A |
| 2,943,887 | 7/1960 | Lyon | 29/453 |
| 3,090,337 | 5/1963 | Lyon | 29/159 A |
| 4,275,930 | 6/1981 | Kamihama | 301/37 SS |

Primary Examiner—Howard N. Goldberg
Assistant Examiner—P. W. Echols
Attorney, Agent, or Firm—Neal A. Waldrop; Jay C. Taylor

[57] ABSTRACT

A multiple part wheel cover comprises a retainer plate, separate axially inner and outer one-piece spoke assemblies, having spokes extending to outer free-standing ends and a hub cover. The retainer plate and inner and outer spoke assemblies are supported coaxially in predetermined axial spacing. Bending force is applied to the spokes to bend them resiliently within elastic limits sufficiently to align their radially outer ends respectively with recesses in the rim. Thereafter the bending force is progressively relaxed and the supported parts are simultaneously and progressively moved coaxially toward each other to cause the outer ends of the spokes to enter their recesses as the spokes straighten resiliently. The parts are then secured together by clamping the hub cover toward the hub of the retainer plate, whereupon removal of the outer ends of the spokes from their recesses is prevented.

2 Claims, 5 Drawing Figures

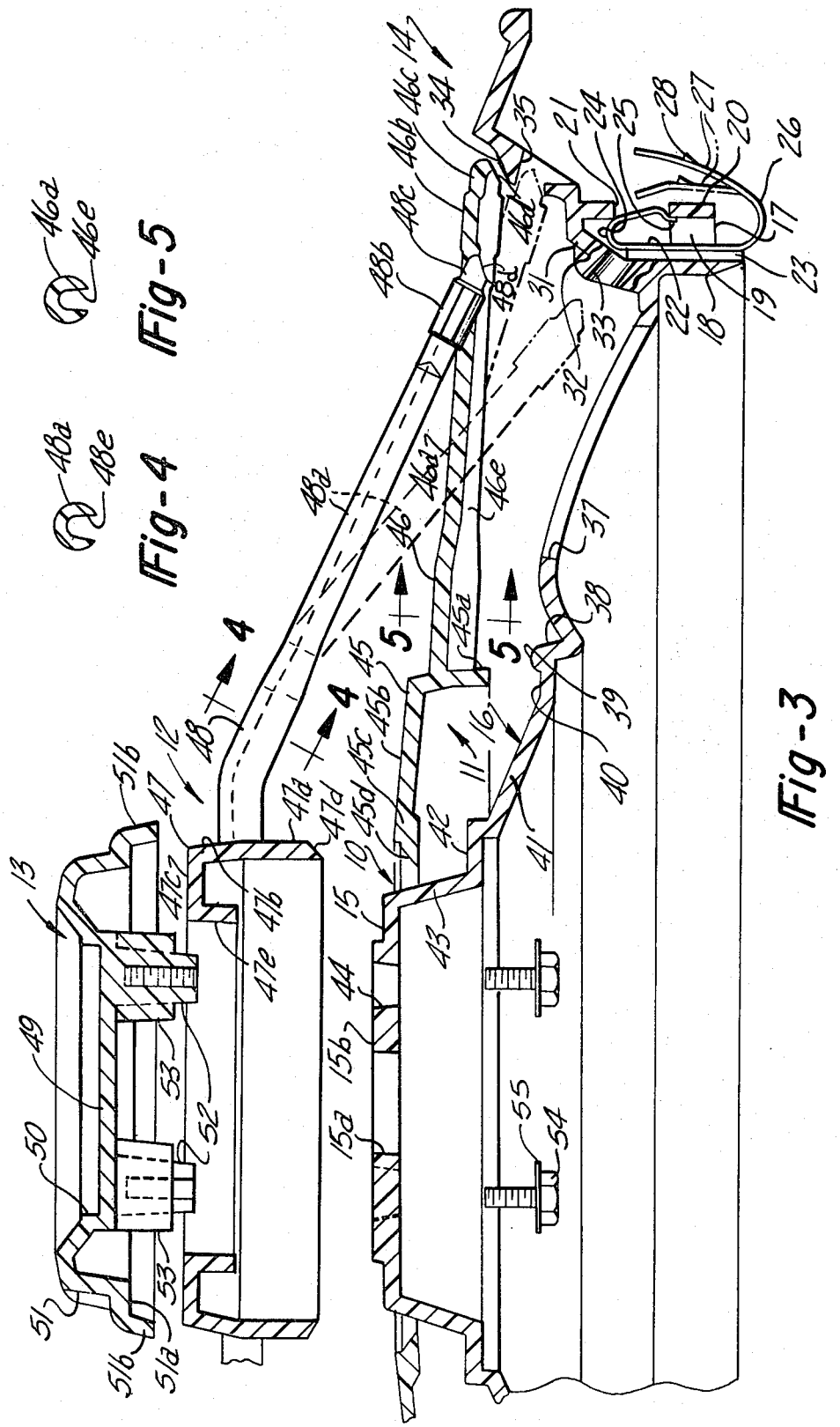

METHOD OF MAKING A WHEEL COVER SIMULATING A WIRE SPOKE WHEEL

This application is a division of application Ser. No. 140,035, filed Apr. 14, 1980, now U.S. Pat. No. 4,397,504.

This invention relates to wheel covers for vehicle wheels and in particular to a lightweight multiple part wheel cover adapted to be removably secured to a vehicle wheel and having a one-piece molded plastic spoke assembly as one of the parts to simulate a wire spoke wheel.

It has been common to provide wheel covers removably attached to a vehicle wheel and having wire spokes or die cast molded spokes to simulate a wire spoke wheel. Such covers, however, have been relatively heavy and costly and because of their weight have also required stronger and more costly devices for securing the cover to the vehicle wheel.

It is an important object of the present invention to provide an improved lightweight one-piece injection molded plastic spoke assembly as part of a wheel cover to simulate a wire spoke wheel. The unitary spoke assembly comprises an annular spoke carrying member having a plurality of spokes extending generally radially therefrom at circumferentially spaced locations. Each spoke has a radially inner end integral with the annular member and extends therefrom to a radially outer end adapted to be secured to a peripheral retainer which in turn is adapted to be secured to a rim flange of a vehicle wheel.

Not only does the molded plastic construction achieve a reduction in weight and cost as compared to conventional wire or simulated wire wheel covers, but the flexibility of the plastic spokes enables simplifications in the fabrication of the wheel cover. It is accordingly another object of the present invention to provide a wheel cover of the character described and an improved and economical method of assembling and securing the peripheral retainer and unitary spoke assembly together to complete the wheel cover.

Another and more specific object is to provide such a wheel cover and method of fabrication comprising a retainer plate having a central hub and a peripheral rim spaced by an intermediate body, the rim comprises a generally radially and axially outwardly inclined flange having portions on its axially inner side adapted to be attached to the rim flange of a vehicle wheel and also having two sets of circumferentially spaced spoke retaining recesses opening generally radially inwardly from its axially outer side. The wheel cover also comprises two separate spoke assemblies of the one-piece type described and a hub cover. One of the spoke assemblies comprises an inner assembly having an annular inner member in coaxial clamping engagement with the retainer plate and having the radially outer ends of its spokes retained within one set of the spoke retaining recesses. The other spoke assembly comprises an outer assembly having an annular outer member in coaxial clamping engagement with the annular member of the inner assembly. The radially outer ends of the spokes of the outer assembly are retained within the second set of spoke retaining recesses. The hub cover is supported coaxially in clamping engagement with the outer annular member and is suitably clamped or bolted to the hub of the retainer plate so as to clamp the inner annular member between the outer annular member and the hub of the retainer plate and thus to secure the several parts or elements of the wheel cover together as a unit.

Another object is to fabricate the wheel cover described above by supporting the inner and outer spoke assemblies in predetermined coaxially spaced relation with respect to the retainer plate and applying bending force to the spokes to bend them resiliently within their elastic limits axially toward the rim of the retainer plate sufficiently to align their radially outer ends with their respective recesses. The bending forces are then relaxed progressively and the spoke assemblies are simultaneously moved progressively toward the retainer plate to enable entry of the radially outer ends of the spokes into their respective retaining recesses as the spokes spring back to their unstressed conditions. Thereafter, the hub cover is bolted to the retainer plate to clamp all of the wheel cover elements securely together as a unit.

By virtue of the foregoing, a lightweight and inexpensive wheel cover is provided wherein its separate elements are readily and economically assembled and secured together and the necessity of handling and assembling a multiplicity of separate spokes of different shapes and sizes is avoided. Other objects of this invention will appear in the following description and appended claims, reference being had to the accompanying drawings forming a part of this specification wherein like reference characters designate corresponding parts in the several views.

FIG. 3 is an exploded view of the separate elements of FIG. 2, illustrating the method of fabricating the wheel cover.

Figure 1:
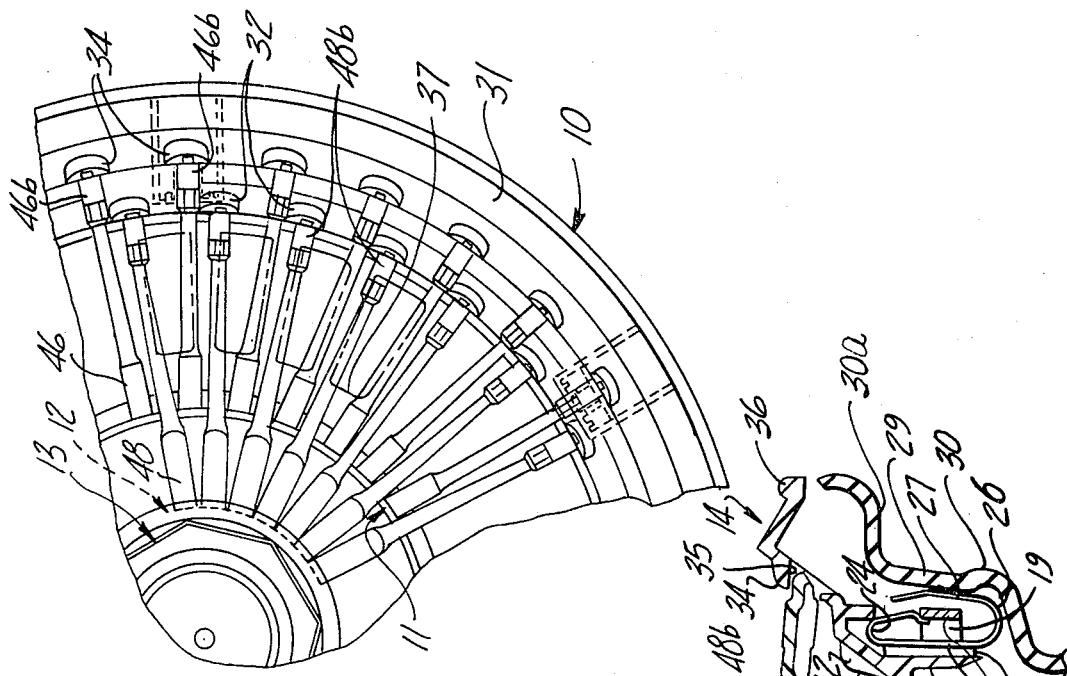
FIG. 1 is a fragmentary side elevational view of a wheel cover embodying the present invention.

FIGS. 4 and 5 are sectional views through the spokes taken in the direction of the arrows substantially along the lines 4—4 and 5—5 respectively of FIG. 3.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, four major elements of the wheel cover comprise an axially inner retainer plate 10 adapted to be secured to a rim flange of a vehicle wheel, an inner spoke assembly 11, an outer spoke assembly 12, and an outer hub cover 13. Each of the elements 11, 12 and 13 preferably comprises a separate unitary or one-piece element formed by conventional injection molding from suitable plastic materials known to the art and having the desired strength, durability and resiliency to enable fabrication of the wheel cover as described herein and to withstand the wear and forces to which the wheel cover is subjected when mounted on a vehicle wheel. The element 10 similarly comprises a one-piece injection molded plastic structure, except for the spring clips described below. The terms "inner" and "outer" are used herein with reference to the vehicle wheel and its major axis to denote radially and axially inner and outer directions as the situation requires.

The retainer plate 10 comprises a peripheral rim 14, a coaxial central hub 15, and an intermediate body 16. Opening inwardly from the inner side of the flange 14 are six or eight spring clip retaining pockets 17, as required. The pockets 17 are uniformly spaced circumferentially and each is defined by an annular base flange 18 extending inwardly from the rim 14, a pair of circumferentially spaced axial sidewalls 19 extending outwardly from the flange 18 and an outer wall 20 extending inwardly from the rim 14 to overlie the base flange 18 and to provide a generally rectangular opening 21 therein.

A separate spring steel retention clip 22 comprising a ribbon of formed spring steel is secured within each pocket 17. Each clip 22 has an axial base supported on several circumferentially spaced and axially extending reinforcing ribs 23 which also extend radially outwardly from the base flange 18. The radially outer end of each spring clip 22 is reversely bent at 24 to engage the wall 20 under resilient tension adjacent to the axially outer edge of the opening 21 and to provide an arm that extends into and is confined within the opening 21 and terminates in an inwardly offset end 25 that underlies the wall 20 under tension at the axially inner edge of the opening 21. The axially inner end of the clip 22 is reversely bent at 26 to provide an outwardly extending arm 27 having a sharp barb 28 adjacent its outer end. The arm 27 is adapted to yield resiliently from its normal unstressed condition, FIG. 3, so as to engage under tension the radially inner surface of an axial flange 29 of the vehicle wheel rim at a location between the conventional safety hump 30 and an outer flange 30a that curves outwardly to provide a concavity to receive wheel balancing weights. The barb 28 embeds into the radially adjacent inner surface of the wheel flange 29 to prevent accidental removal of the retainer plate 10 from the vehicle wheel.

The structure and operation of the retention means, including the spring clips 22 and the engagement between the barbs 28 and wheel flange 29 are well known to the art as described for example in U.S. Pat. No. 3,873,161. This structure is accordingly not described in further detail. Also in lieu of the retention means shown, including the spring clips 22 and associated structure, numerous other retention means may be employed with the present invention.

The rim 14 also comprises an annular rim flange 31 that extends obliquely outwardly from the periphery of the intermediate body 16 and is provided with two separate sets of spoke retaining bosses, including a radially inner set of circumferentially and uniformly spaced bosses 32 and a radially outer set of circumferentially and uniformly spaced bosses 34. Each boss 32 and 34 is provided respectively with a spoke retaining recess 33 and 35 that opens generally radially inwardly. The rim flange 31 extends outwardly from the set of bosses 34 and terminates in an annular reinforcing bead 36, so as to overlie and conceal the wheel flange 30a when the retainer 10 is secured to the vehicle wheel.

The annular portion of the body 16 adjacent flange 31 is reinforced by an outwardly bulged portion having a plurality of circumferentially spaced openings or windows 37 therein which serve as an ornamental feature and also reduce weight and the amount of plastic material required. Adjacent to the radially inner edges of the windows 37 is an annular reinforcing offset 38 and locating bead 39 which define the outer edge of an annular radial platform or seat 40 for a flange of the inner spoke assembly 11. From the annular seat 40, the plate 16 inclines conically at 41 to a second annular radial platform 42 for the inner spoke assembly 11. Radially inwardly of the platform or seat 42, the plate 16 inclines conically at 43 to the radial hub 15. The latter extends annularly around a central opening 15a and provides an axially thickened portion 15b having four slightly conical and circumferentially spaced openings 44 extending axially therein to receive a corresponding number of bolt-receiving bosses of the hub cover 13.

The inner spoke assembly 11 comprises an annular inner member 45 having a generally axially extending annular flange 45a which may be supported on the seat 40 or spaced therefrom by a slight clearance and which is integral with the radially inner ends of a plurality of generally radially extending spokes 46. The member 45 also comprises a radial annular extension 45b which terminates inwardly at an annular axially thickened portion 45c. The inner circumference of the latter comprises a conical centering surface 45d that inclines radially and axially outwardly at approximately a 45° angle.

From the radial flange 45a, the spokes 46 taper outwardly at 46a to thickened portions 46b of hexagonal cross-section to simulate a spoke tightening nut on each spoke 46 adjacent to its outer extremity. Endwise of each hexagonal portion 46b, the spoke 46 terminates in a nose 46c retained in one of the openings 35. The axially inner portion of each nose 46c may be chamfered at 46d to facilitate insertion of the spoke end 46c within its retaining recess 35 as described below.

The outer spoke assembly 12 comprises an annular member 47 having an annular axially extending flange 47a that terminates in a conical locating surface 47d mating with the surface 45d to maintain the assemblies 11 and 12 in coaxial alignment with the retainer plate 10. When thus aligned flange 45a is supported on seat 40 adjacent the locating bead 39 to assist the coaxial alignment.

The axial flange 47a is also integral with the radially inner ends of a plurality of spokes 48 and converges outwardly of the latter at 47b to the outer periphery of an annular radial flange 47c which terminates in an annular inwardly directed axial rigidizing flange 47e. The flange 47e terminates at or adjacent to the hub 15 to serve as a movement limiting stop in the event of an unusual stack-up of dimensional tolerances. Normally a slight clearance will exist between flange 47e and hub 15. Also, the resulting box-like structure in cross section resists torsional deformation of the annular member 47 during assembly of the four parts 10, 11, 12 and 13 as described below.

Each of the spokes 48 extends generally radially outwardly from the flange 47a for a short distance, then tapers endwise at 48a and converges axially toward its respective retaining opening 33. Immediately inward of each opening 33, the associated spoke 48 is provided with a hexagonal enlargement 48b to simulate a nut similar to the enlargement 46b. The radially outer end 48c of each spoke 48 within its recess 33 is chamfered at its axially inner side 48d to facilitate insertion into the opening 33.

As illustrated in FIGS. 4 and 5, the axially inner side of each spoke 48 and 46 is recessed at 48e and 46e respectively to reduce weight and the amount of plastic rerequired, and also to facilitate resilient bending of the spokes and to improve the quality of the molded elements by minimizing excessive localized shrinkage of the plastic that might otherwise result after the injection molding if the overall thickness of each spoke were appreciably thicker than other portions of the associated spoke assembly. The recesses or channels 46e and 48e extend the length of their associated spokes and gradually narrow toward the radially outer ends of the spokes as their outer diameters gradually become smaller. Thus, the wall thickness of the spokes at opposite sides of their recesses 46e and 48e remains substantially constant and comparable to the thickness of other parts of the spoke assemblies.

The hub cover 13 comprises a central circular plate 49 coaxial with the plate 10 and having a peripheral shoulder 50 extending axially outward to define the inner periphery of a hexagonal hub cap nut simulating portion 51. The outer periphery of the nut portion 51 comprises an annular radial shoulder 51a that seats on the flange 47c of the outer spoke assembly 12, and also comprises a conical skirt 51b that closely overlies and mates with the conical surface 47b of the outer spoke assembly 12.

Extending integrally inward from plate 49 are four uniformly circumferentially spaced inwardly tapered conical bolt-receiving bosses 52 within the four mating conical openings 44 of the thickened hub portion 15b. Associated with each boss 52 and integral therewith are four buttresses or spacers 53 which are also integral with plate 49 and extend axially to seat on the thickened hub portion 15b. The four spacers 53 associated with each boss 52 are arranged in uniformly spaced pairs at diametrically opposite sides of the associated boss 52. Each conical boss 52 is provided with a bolt-receiving bore. A self-tapping bolt 54 is tightly screwed into the bore of each boss 52 from the inner side of the hub portion 15b. A locking washer 55 is located between the head of each bolt 54 and the axially inner surface of hub portion 15b. Where desired, a threaded metal insert may be molded into each of the bores of the bosses 52 to receive the threaded shanks of the bolts 54.

The hub cover 13 is thus clamped tightly toward the retainer plate 10, thereby to clamp the annular shoulder 51a of the hub cover 13 axially against the seat 47c and thereby also to clamp the conical centering surface 47d of the outer spoke assembly 12 axially against the mating conical centering surface 45d to maintain the assemblies 11 and 12 in coaxial alignment by the resulting annular wedge action and to force the annular flange 45c of the inner spoke assembly 11 axially against the seat 42 of the retainer plate 10. A similar coaxial alignment action results from the interengagement between the mating conical portions 47b and 51b. In this regard all of the annular parts of the elements 10, 11, 12 and 13 are of course coaxial with the axis of the plate 10, which in turn is coaxial with the vehicle wheel when properly mounted thereon.

In fabricating the wheel cover described, each of the four elements 10, 11, 12 and 13 is first formed in a separate die by injection molding to provide the unitary or one-piece plastic structures described. The elements 10, 11 and 12 in particular, may be chrome plated by suitable conventional processes, so that when the elements are secured together and attached to a vehicle wheel, the appearance of a chrome wire spoke wheel will result.

In order to secure the elements together, they are supported in coaxial alignment substantially as illustrated in FIG. 3 with the spokes aligned angularly with their respective retaining recesses and spaced axially therefrom. The elements are then progressively moved axially toward each other. At predetermined axial spacings, bending forces are applied to the resilient spokes 46 and 48 to bend them within their elastic limits axially toward the retainer plate 10, as illustrated by their phantom positions, FIG. 3, until the spoke ends 46c and 48c are substantially aligned radially with their respective recesses 35 and 33. Thereafter, as the axial movement of the elements 10, 11, 12 and 13 toward each other continues, the bending force is progressively relaxed to enable return of the spokes 48 and 46 resiliently to their unbent positions, thereby to project their respective ends 46c and 48c into their respective retaining recesses 35 and 32. The clamping bolts 54 are then screwed into the retainers 52 to secure the elements together as described above and to prevent removal of the outer ends of the spokes from their respective retaining recesses.

Figure 2:
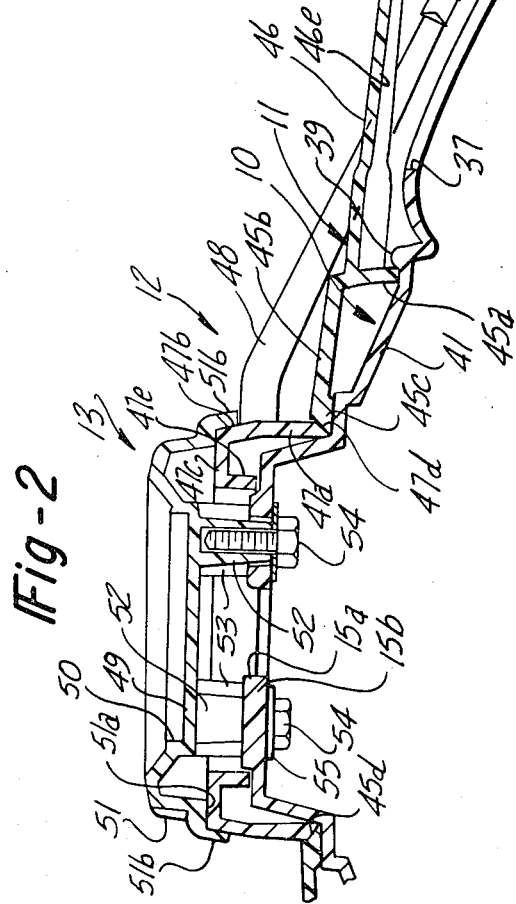
FIG. 2 is an enlarged axial mid-section through the wheel cover of FIG. 1, showing its attachment to a rim flange of a vehicle wheel.

When the elements 10, 11, 12 and 13 are in their final assembled condition, FIGS. 1 and 2, the spokes 46 and 48 will no longer be under tension. The recesses 33 and 35 will provide a slight clearance for the ends 48c and 46c confined therein and the simulated nuts 48b and 46b will substantially conceal the openings 33 and 35. The channels 48e and 46e will closely confront the plate or body 16 of retainer 10 and are dimensioned so as to be out of the usual line of sight from the exterior or axially outer side of the assembled wheel cover.

The chamfered ends 48d and 46d facilitate entry of the spoke ends into their retaining recesses. In some situations, depending upon the arrangement and dimensions of the spokes 46 and 48 with respect to the rim 14 and the spoke retaining recesses 35 and 33, the chamfered ends 46d and 48d are not required.

Because of the great multiplicity of spokes, as for example, thirty uniformly spaced spokes in each set or assembly, sixty spokes in all, it may be difficult in some situations to secure the spokes of both the inner and outer spoke assemblies within their respective recesses in a single operation. In such a situation, the inner spoke assembly 11 will first be assembled with the retainer 10 by supporting the inner assembly 11 and retainer plate 10 in the axially spaced coaxial alignment described above while bending the spokes 46 within their elastic limits axially toward the plate 10 until the spoke ends 46c are aligned with their respective retaining recesses 35. The bending force is then progressively relaxed while the members 10 and 11 are moved coaxially toward each other until the resilient unbending or straightening of the spokes 46 moves their ends 46c into their respective retaining recesses 35.

Thereafter, in a similar manner, the outer spoke assembly 12 is maintained in the desired predetermined alignment and spacing with respect to the retainer 10 and inner spoke assembly 11. As before, the bending force is applied to the spokes 48 until their ends 48c are aligned radially with their respective retaining recesses 33. The relative axial movement of the outer spoke assembly 12 toward the retainer 10 is continued with simultaneous relaxation of the bending force to enable straightening of the resilient spokes 48 and insertion of their ends 48c into their retaining recesses 33. The hub cover 13 is then fitted coaxially over the annular member 47 and clamped tightly toward the retainer 10 by tightening the bolts 54.

I claim:

1. The method of fabricating an ornamental wheel cover to simulate a vehicle wheel with wire spokes, the steps of forming a retainer having a central hub and a peripheral rim spaced by an intermediate body, the rim having a portion adapted to be secured to a rim flange of a vehicle wheel and also having a plurality of spoke retaining recesses therein at circumferentially spaced locations, molding a one-piece plastic spoke assembly of resilient material to provide an annular member of smaller diameter than said rim and a plurality of resilient spokes having radially inner ends integral with said annular member at a plurality of circumferentially spaced locations, the spokes extending generally radially from their inner ends to radially outer ends insertable respectively within a set of said recesses, applying bending force to said spokes to move their radially outer ends resiliently toward said retainer and reduce the radial extent of each spoke sufficiently to enable radial alignment of its radial outer end with its respective recess for insertion thereinto while simultaneously supporting said retainer and spoke assembly coaxially in axially spaced relation to effect the radial alignment of each radially outer end with its respective recess, thereafter progressively moving the coaxial retainer and spoke assembly axially toward each other while simultaneously relaxing the bending force progressively to enable gradual return of said spokes to their unstressed condition to maintain said radial alignment and effect insertion of said radially outer ends into their respective recesses, thereafter securing said spoke assembly to said retainer.

2. The method according to claim 1, molding a second one-piece plastic spoke assembly of resilient material to provide a second annular member of smaller diameter than said rim and a second plurality of resilient spokes having radially inner ends integral with the second annular member at a plurality of circumferentially spaced locations, the second plurality of spokes extending generally radially from their inner ends to radially outer ends insertable respectively within a second set of said recesses respectively, prior to securing the first named spoke assembly to said retainer, applying bending force to said second plurality of spokes to move their radially outer ends resiliently toward said retainer and reduce the radial extent of each spoke of said second plurality of spokes sufficiently to enable radial alignment of its radial outer end with its respective recess for insertion thereinto while simultaneously supporting said retainer and second spoke assembly coaxially in axially spaced relation to effect the radial alignment of each last named radially outer end with its respective recess, thereafter progressively moving the coaxial retainer and second spoke assembly axially toward each other while simultaneously relaxing the bending force progressively to enable gradual return of the bent spokes to their unstressed condition to maintain said alignment and effect insertion of their radially outer ends into their respective recesses, thereafter clamping said first named annular member between said second annular member and retainer.

* * * * *